United States Patent
Arnold et al.

(10) Patent No.: US 6,729,684 B2
(45) Date of Patent: May 4, 2004

(54) MODULE, IN PARTICULAR A SLIDING ROOF MODULE FOR A MOTOR VEHICLE

(75) Inventors: Rainer Arnold, Obertshausen (DE); Margit Schnabel, Nidda (DE); Klaus Stallfort, Wehrheim (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/185,423

(22) Filed: Jun. 27, 2002

(65) Prior Publication Data
US 2003/0011215 A1 Jan. 16, 2003

(30) Foreign Application Priority Data
Jul. 10, 2001 (DE) .......................... 101 33 436

(51) Int. Cl.⁷ ................................. B60J 7/047
(52) U.S. Cl. ................... 296/223; 296/220.01
(58) Field of Search ............. 296/220.01, 223, 296/216.03

(56) References Cited

U.S. PATENT DOCUMENTS 5,897,160 A  *  4/1999  Reihl ............... 296/220.01
6,416,122 B1      7/2002  Schwarz et al.
6,491,340 B2  *  12/2002  Hori ...................... 296/214

FOREIGN PATENT DOCUMENTS

| DE | 3715268 A1 | 1/1988 |
| DE | 3735686 C1 | 12/1988 |
| DE | 19713348 C1 | 7/1998 |
| DE | 29815104 U1 | 2/2000 |
| DE | 19941984 C1 | 10/2000 |
| DE | 19953104 C1 | 2/2001 |

OTHER PUBLICATIONS

German Search Report dated Jul. 30, 2002.
European Search Report dated Sep. 12, 2002.

* cited by examiner

*Primary Examiner*—Dennis H. Pedder
(74) *Attorney, Agent, or Firm*—Carlson, Gaskey & Olds

(57) ABSTRACT

A module, in particular a sliding roof module for a motor vehicle, comprises at least one guide, at least two carriages which are adapted to be moved in the guide and to which one component each is attached which is a component that is to be operated. The module further comprises at least a first catch which is connected with a drive device such that it can be shifted in the guide. The first catch and at least one of the carriages are designed such that the at least first catch can be coupled with one of the carriages and is able to shift it and, after a predetermined shifting of the carriage, can be detached from it.

13 Claims, 9 Drawing Sheets

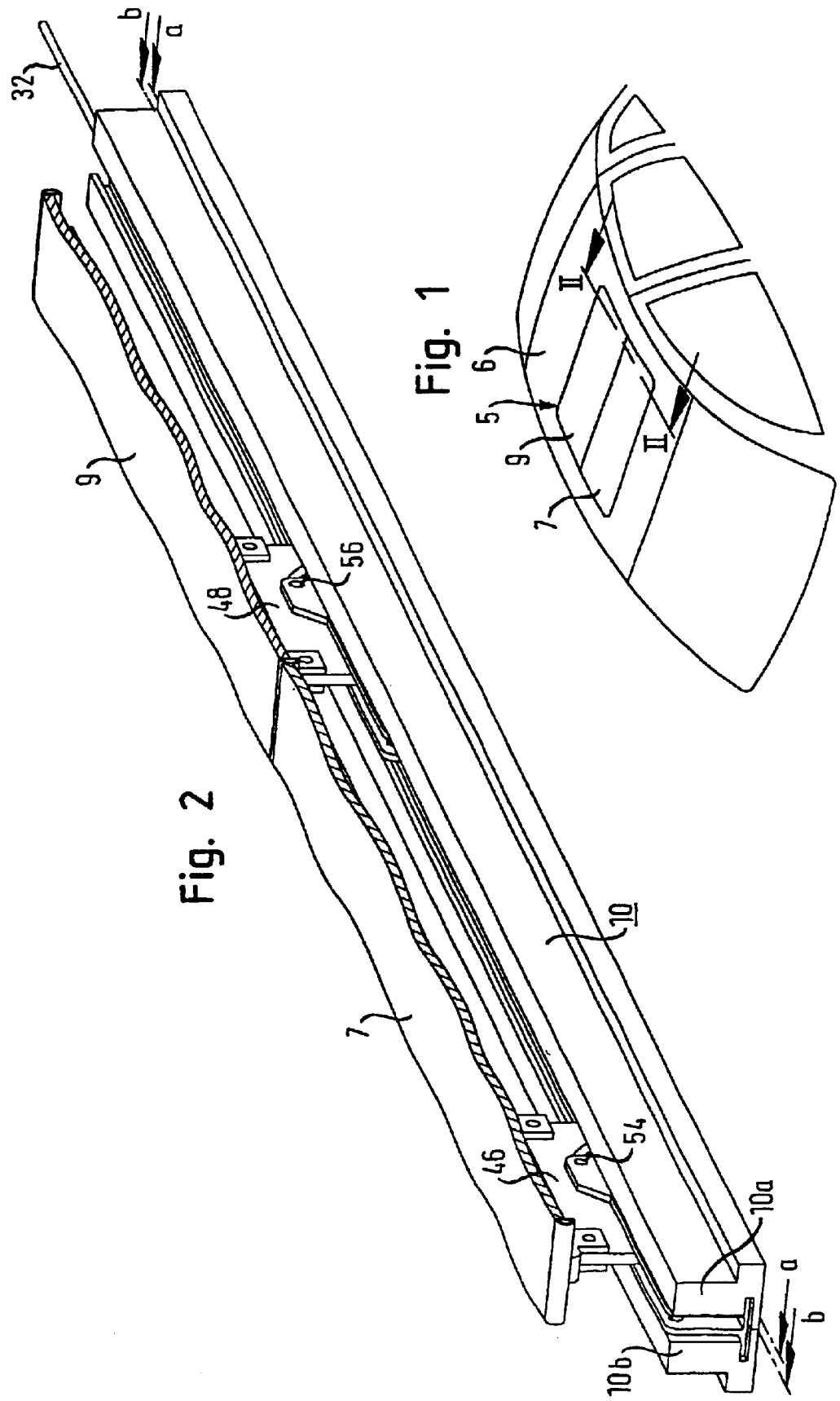

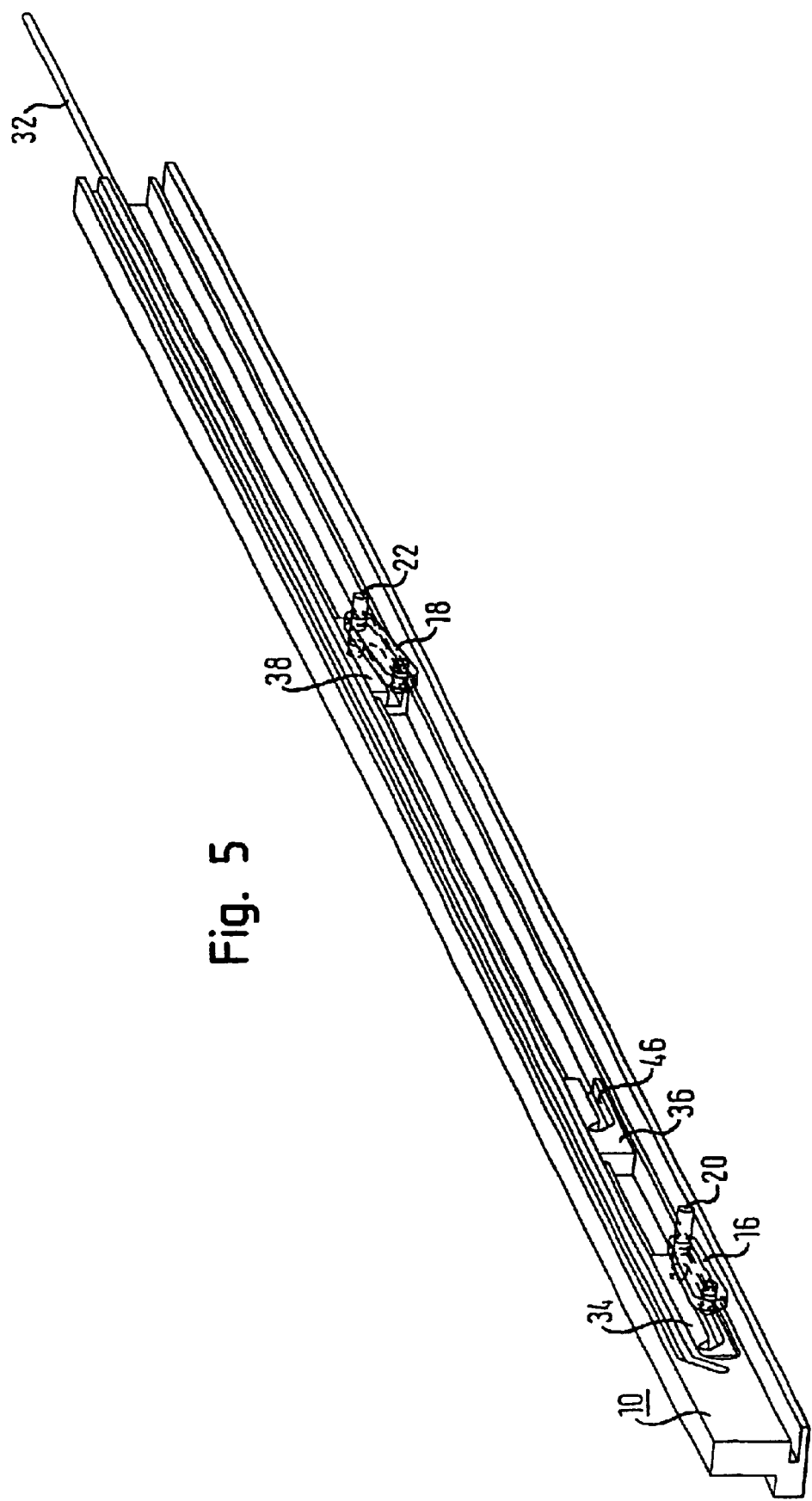

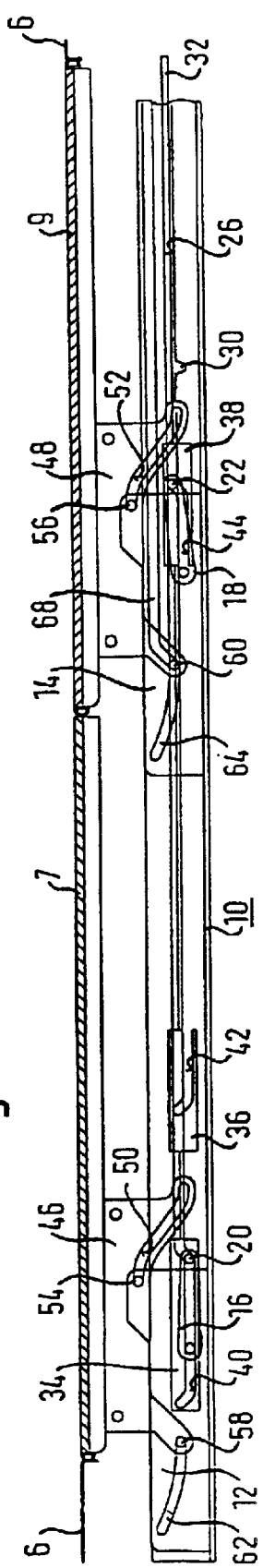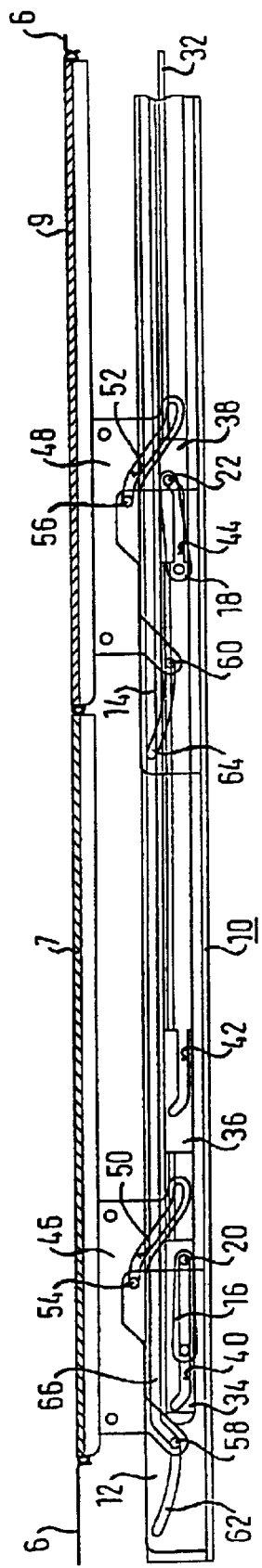

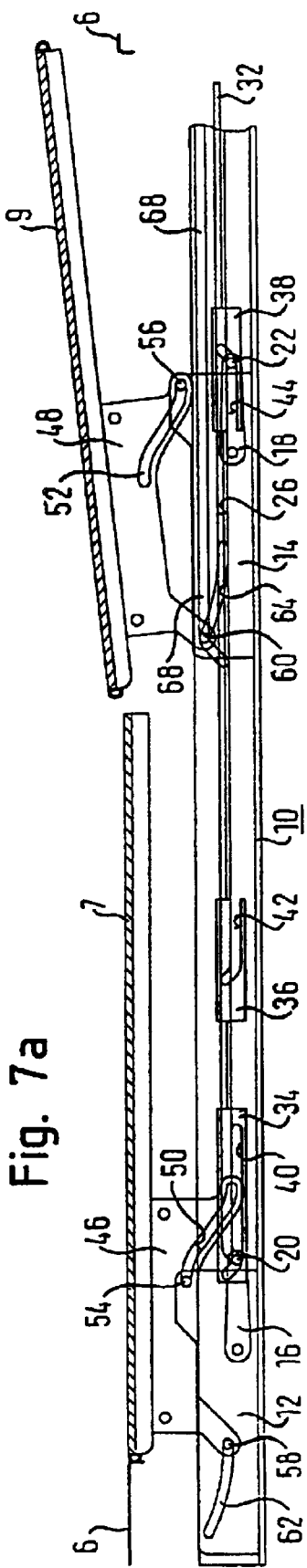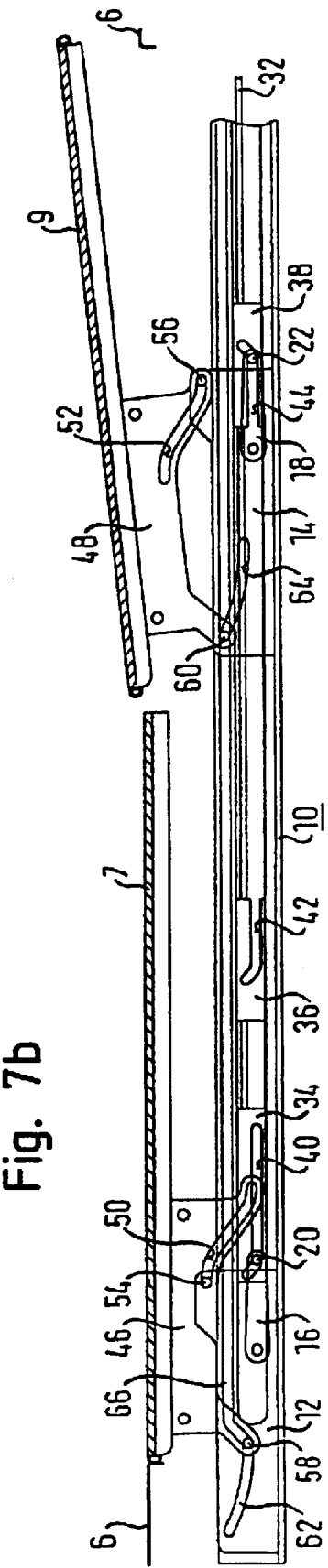
Fig. 7a
Fig. 7b

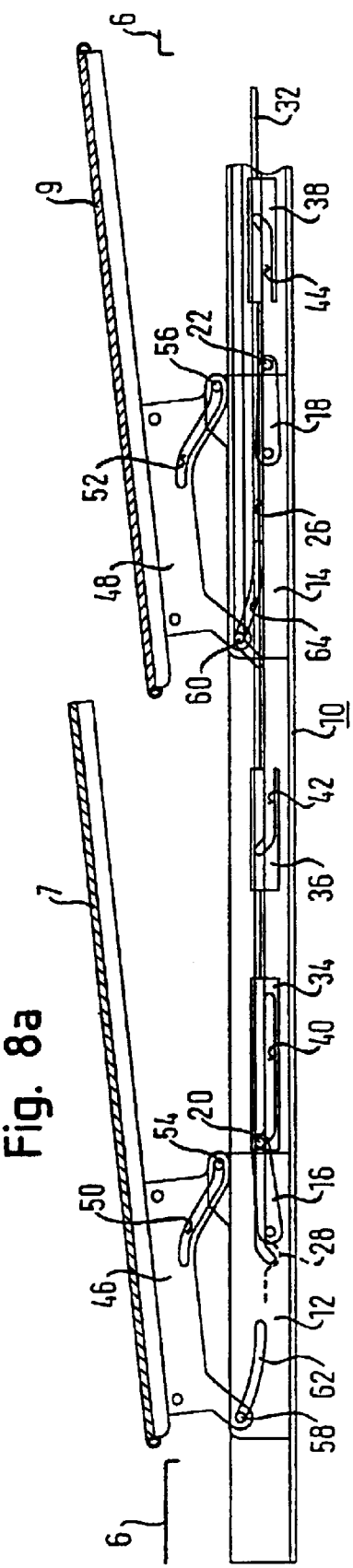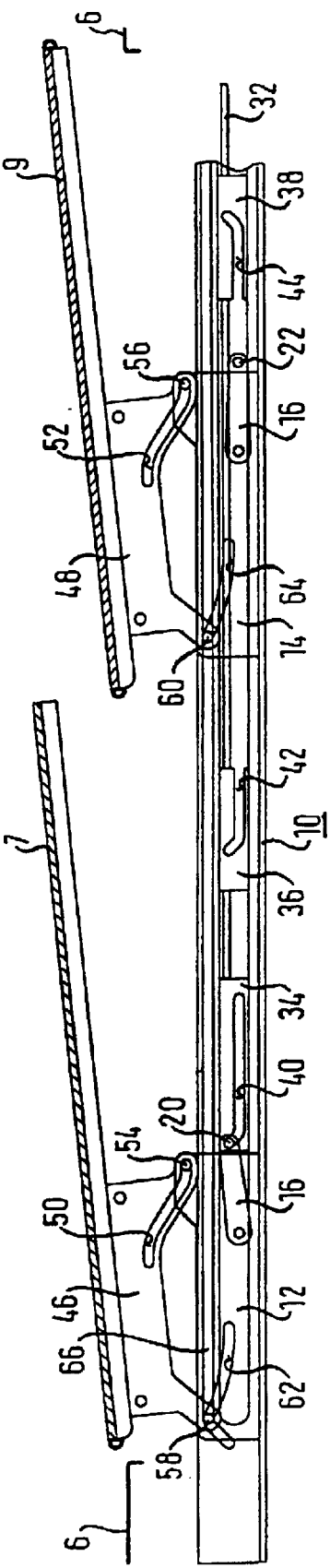

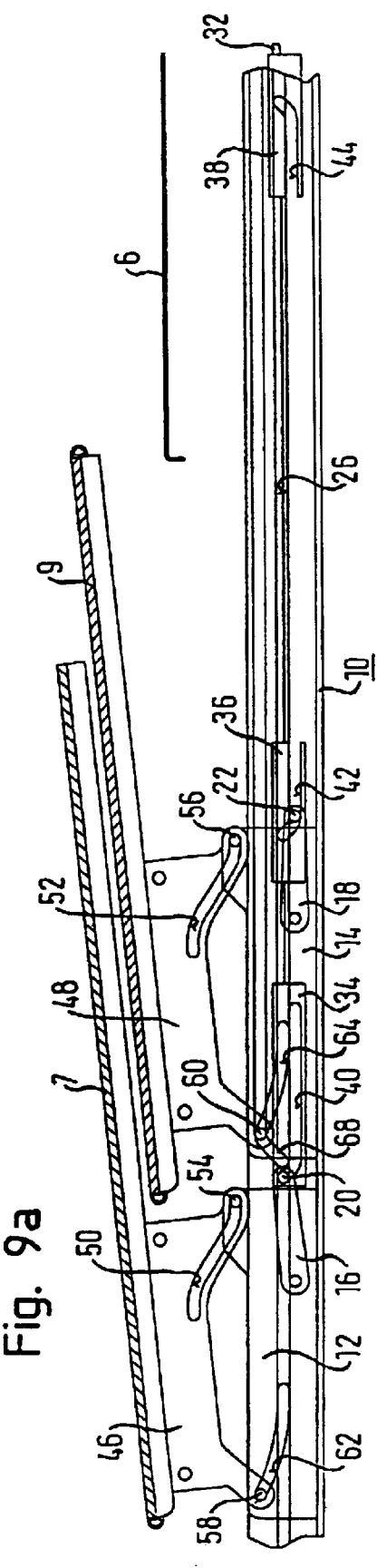

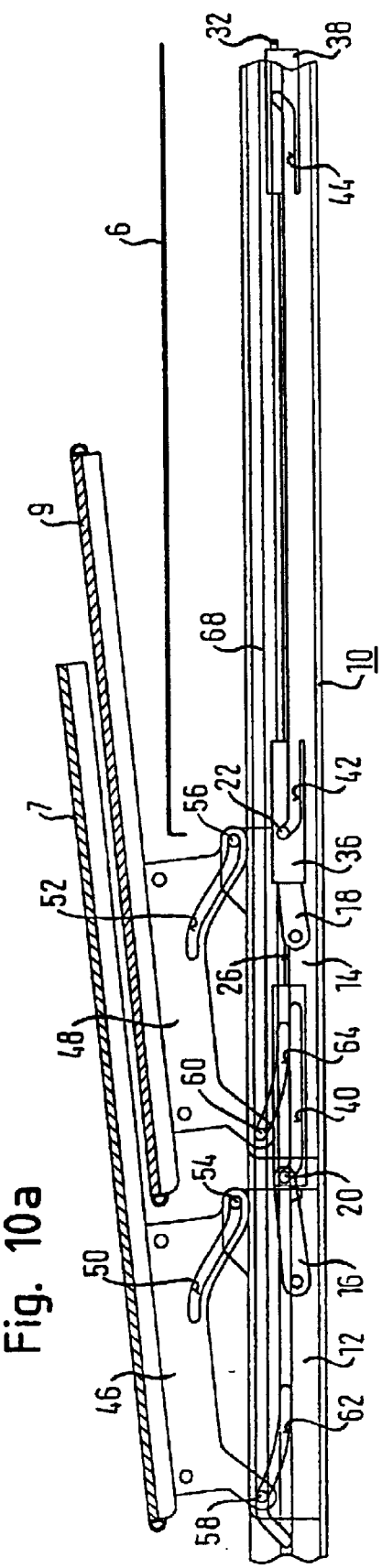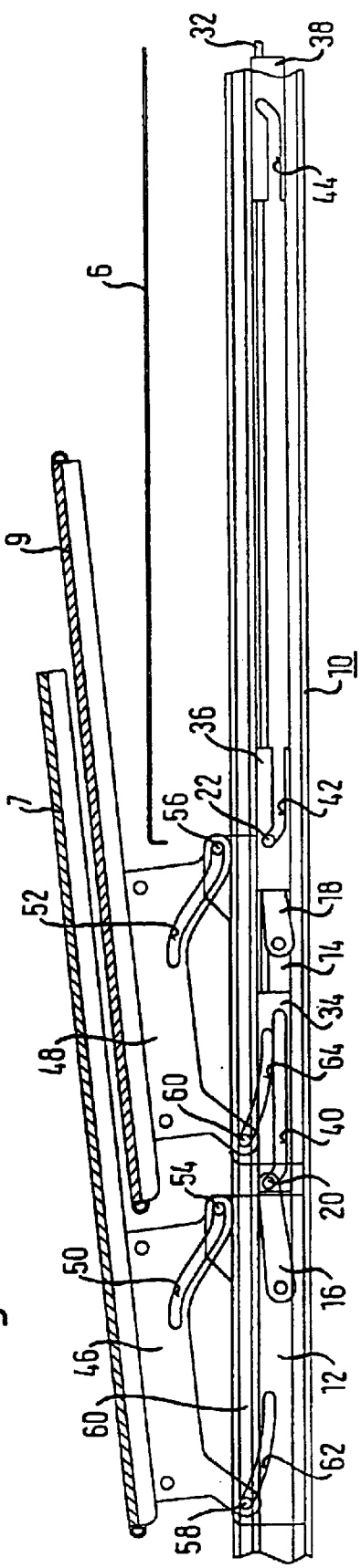

MODULE, IN PARTICULAR A SLIDING ROOF MODULE FOR A MOTOR VEHICLE

TECHNICAL FIELD

The invention relates to a module, in particular a sliding roof module for a motor vehicle. The module comprises at least one guide, at least two carriages, which are adapted to be moved in the guide, and a catch connected to a drive device.

BACKGROUND OF THE INVENTION

A sliding roof module for a motor vehicle may comprise a cover piece of a sliding roof that includes two or more cover pieces. The cover pieces may be attached to each of the carriages. The cover pieces are adjustable and movable independently from each other to allow different relative positions. For instance, it may be desirable to bring one of the cover pieces from a closed position into a so-called ventilation position. In the ventilation position, the cover piece is placed at an angle such that its rear edge, as seen in the travel direction of the vehicle, is lifted. Furthermore, it may be desirable to bring another cover piece from its closed position via a ventilation position into an open position, while the other cover piece is in the ventilation position.

To independently actuate the two cover pieces relative to each other, there is provided in prior art, one drive device for each carriage. The drive device may be a cable, which is guided in a stiff fashion and, hence, is non-buckling. The cable is connected to a corresponding carriage and is shifted by a drive motor in a suitable manner. This design is expensive to construct, especially due to the high cost of motors.

The object of the invention therefore consists in further developing a roof module at low expenditure and at low costs to shift at least two carriages through a single drive device.

BRIEF SUMMARY OF THE INVENTION

According to the invention, there is proposed a module, in particular a sliding roof module for a motor vehicle, which comprises at least one guide and at least two carriages, which are adapted to be moved in the guide. Each component to be operated is attached to a carriage. The module further has at least a first catch, which is connected with a drive device such that the catch can be shifted in the guide. The first catch and at least one of the carriages are designed such that the first catch can be coupled to one of the carriages to shift the carriage and, after a predetermined amount of shifting, can be detached from the carriage.

With the single drive device, the actuation of several carriages is made possible. A catch, which is fixedly connected to the drive device at a suitable location, is coupled to a carriage at a suitable position of the drive device. The catch entrains the carriage with a further shifting of the drive device and then again decoupled from the carriage. If the drive device is then further shifted, it is possible to couple another catch to the particular carriage or even to another carriage, and to decouple the catch therefrom again. By suitably arranging the catches on the drive device, there are defined selected regions of the shift path of the drive device in which there occurs a combined action with one of the carriages. In this way, several carriages can be successively or even simultaneously shifted with one single drive device per guide and one single drive motor for this drive device.

A module may, of course, also comprise two guides arranged so as to be opposite each other, which extend, for example, along the side edges of a roof opening and each bear several carriages. It is further to be noted that the term "coupling" not only means that the catch rests at one of the carriages but also includes a connection to the carriage such that both tensile and pushing forces are able to be transferred.

Advantageous designs of the invention will be apparent from the below claims.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 shows in a schematic, perspective view a vehicle roof with a sliding roof module.

FIG. 2 shows in a schematic, perspective view a section along plane II—II of FIG. 1, highlighting a guide rail of the sliding roof module.

FIG. 5 shows a view corresponding to that of FIG. 2 with more components removed to show other components.

FIGS. 6a and 6b are sectional views of the guide rail of FIG. 2 along the planes a and b of FIG. 2, with two cover pieces of the sliding roof cover being shown in the closed position.

FIGS. 7a and 7b are sectional views of the guide rail of FIG. 2 along the planes a and b of FIG. 2 with the rear cover piece shown in the ventilation position.

FIGS. 8a and 8b show sectional views of the guide rail of FIG. 2 along the planes a and b of FIG. 2 with the front and rear cover pieces shown in the ventilation position.

FIGS. 9a and 9b are sectional views of the guide rail of FIG. 2 along the planes a and b of FIG. 2 with the rear cover piece in the ventilation position and the front cover piece shown in a position approaching the rear cover piece.

FIGS. 10a and 10b are sectional views of the guide rail of FIG. 2 along the planes a and b of FIG. 2 with the two cover pieces shown in an open position.

BRIEF DESCRIPTION OF THE PREFERRED EMBODIMENT

Figure 3:
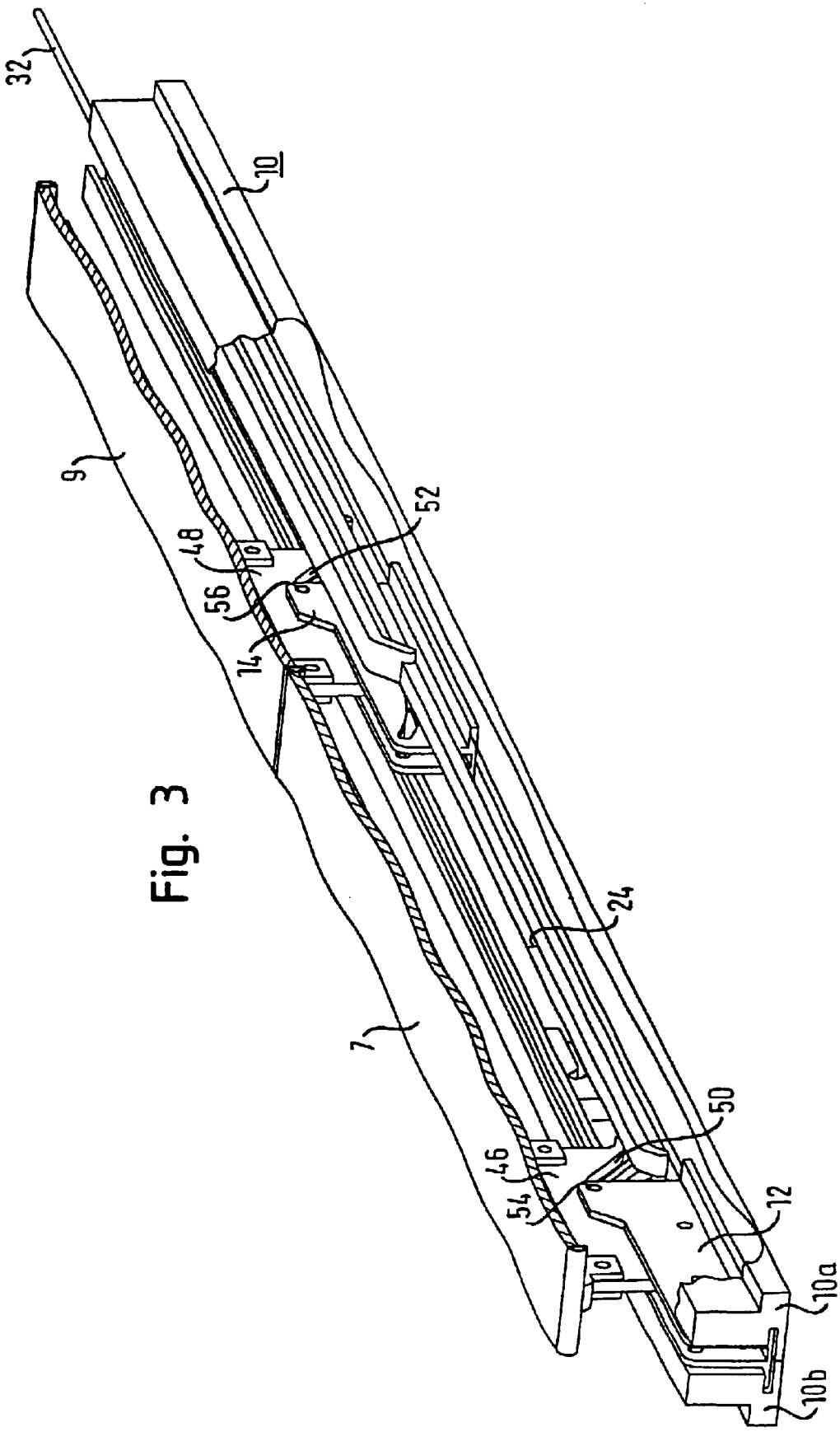
FIG. 3 shows a view corresponding to that of FIG. 2 with parts of the guide rail omitted to expose components arranged internally.

Although the embodiment illustrated in the drawings is a sliding roof module with two cover pieces, the design according to the invention may also be used for actuating other movable parts, such as for actuating a sun shield, a window blind or a wind deflector, in addition to the shifting of cover pieces. Actuating more than two cover pieces is also possible.

The sliding roof module 5 shown in FIG. 1 is provided on a vehicle roof 6 of a vehicle and has a first cover piece 7 and a second cover piece 9. The first cover piece 7 and the second cover piece 9 can be shifted from a closed position shown in FIG. 1 into an open position where they expose a roof opening of the vehicle roof. The two cover pieces 7, 9 are guided in two guides, which are each configured as a guide rail 10 here. Each guide rail extends along the side edges of the roof opening of the vehicle.

Figure 4:
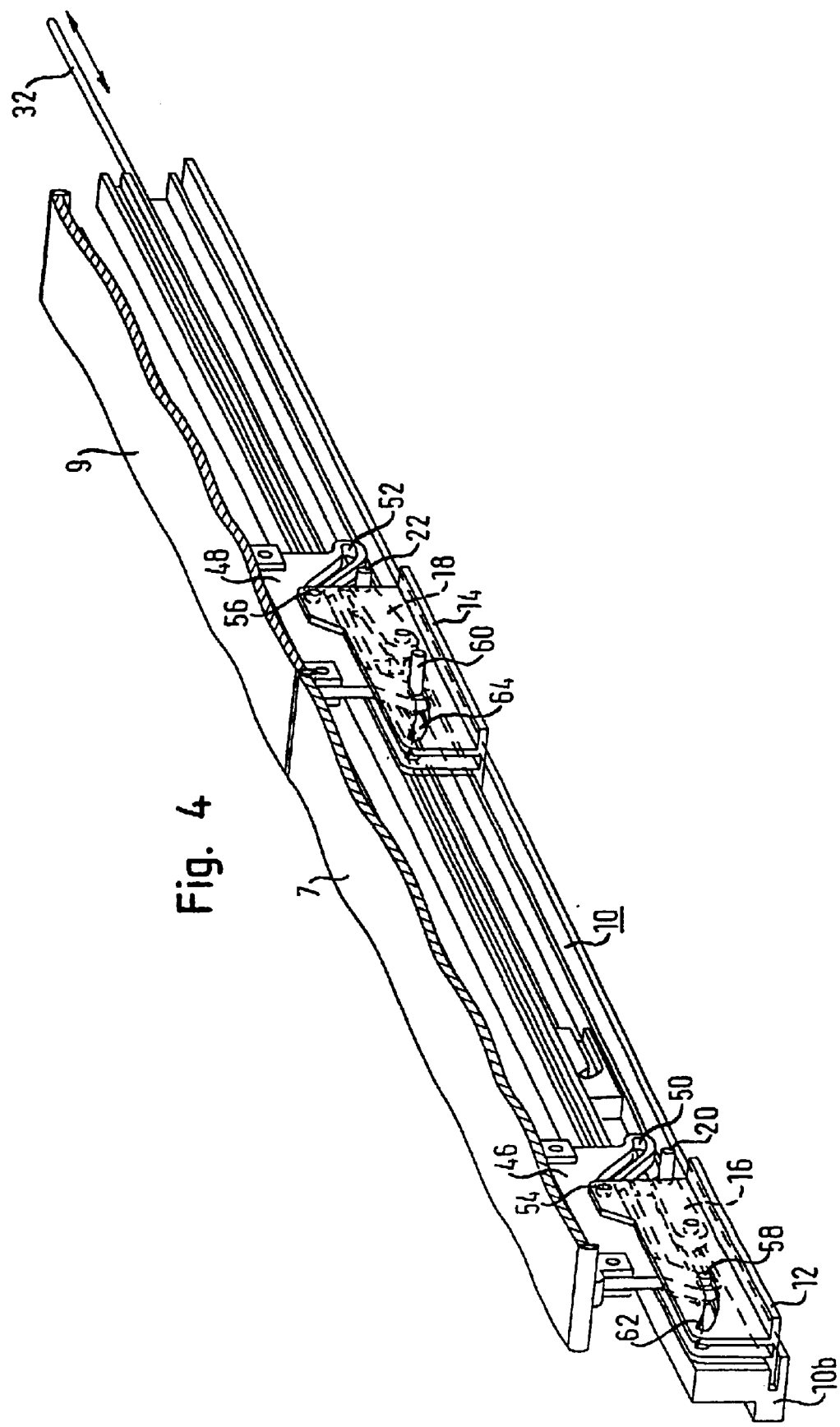
FIG. 4 shows a view corresponding to that of FIG. 2 with a half of the guide rail omitted to expose components arranged internally.

As shown in FIGS. 2 and 3, each of the guide rails has two elements 10a, 10b of which one is directed to the roof opening of the vehicle and the other to the outer side of the vehicle. A first carriage 12 and a second carriage 14 are movably received in the guide rail. Each of the carriages 12, 14 is provided with a bar 16 and 18, respectively. Both 16 and 18 are each pivotally attached at one end to the corresponding carriage 12 and 14, respectively, and are provided at the other end with a coupling element in the form of a coupling bolt 20 and 22, respectively. Each of the coupling bolts 20, 22 extends laterally beyond the corresponding bar 16, 18 (see in particular FIGS. 4 and 5), so that they are able to cooperate with a locking cam surface 24 and 26, respectively. The first locking cam surface 24, associated with the first bar 16 and the first coupling bolt 20, is defined by the top surface of a guide path which, with regard to the Figures, is arranged in the front part 10a of the guide rail 10. The second locking cam surface 26, associated with the second bar 18 and the second coupling bolt 22, is arranged as a guide path in the rear part 10b of the guide rail 10 with regard to the Figures.

Recess 28 is provided in the front part 10a of the guide rail 10 (see FIG. 8a). Coupling bolt 20 of the first bar 16 can engage in recess 28, for arresting the first carriage 12, connected with the first bar 16, relative to the guide rail. The second part 10b of the guide rail is provided with a recess 30 (see FIG. 6a) into which the coupling bolt 22 of the second bar 18 can engage, for arresting the second carriage 14, connected with the second bar 18, relative to the guide rail.

A drive device in the form of a non-buckling cable 32 is arranged in the guide rail, and can be shifted by an external (not shown) drive motor in the longitudinal direction of the cable. A first catch 34, a second catch 36 and a third catch 38 are fixedly connected with the cable. The catches are movably arranged in the guide rail 10. The catches 34, 36, 38 are secured to the cable 32 so as to have fixed distances relative to each other. The first catch 34 has a coupling cam surface that is configured as a closed slot 40 here. The coupling bolt 20 of the first bar 16 engages in the slot 40. The slot 40 has a straight section extending in parallel to the shifting direction of the first catch 34 as well as a curved section which is arranged at the left end with regard to the Figures and extends from the straight section in upward direction. Similarly, the second catch 36 has a slot 42 which, however, is open at the right end. The slot 42 of the second catch likewise has at the left end a section, which is curved in an upward direction. The third catch 38 has a slot 44, which is configured mirror-inverted to the slot 42 of the second catch; that is, the slot 44 is open at its left end and has at its right end a section which is curved in an upward direction.

Attached to the first carriage 12 is a first mounting part 46 to which, in turn, the first cover piece 7 is attached. Attached to the second carriage 14 is a second mounting part 48 to which the second cover piece 9 is attached. The mounting parts 46, 48 are each provided with one guide slot 50 and 52, respectively, in which a guide pin 54 and 56, respectively, engages which is fixedly attached to the first carriage 12 and the second carriage 14, respectively. Each of the guide slots 50, 52 extends, starting from its left end with regard to the Figures, firstly across a short section in parallel to the shifting direction of the catches in the guide rail, then obliquely away from the corresponding cover piece 7 or 9 towards the guide rail and then again towards its right end across a short section in parallel to the shifting direction.

The mounting parts 46, 48 are each connected with the corresponding carriage 12, 14 through a shift bolt 58 and 60, respectively, which is fixedly attached to the corresponding mounting part. The shift bolts 58, 60 cooperate with a carriage cam surface, which is configured as a shift slot 62 and 64 in the first carriage 12 and the second carriage 14, respectively. Each shift slot is curved and extends, starting from its left end with regard to the Figures, from the cover pieces away in downward direction. The shift bolts 58, 60 further cooperate with a shift cam surface 66 and 68, respectively. The shift cam surface 66, cooperates with the shift bolt 58 guided in the first carriage 12, and is arranged in the second part 10b of the guide rail. The shift cam surface 68 cooperates with the shift bolt 60 guided in the second carriage 14, and is arranged in the first part 10a of the guide rail. Correspondingly, the shift bolt 58 associated with the first carriage 12 does not protrude beyond the outer side of the first carriage 12 visible in FIG. 4, but protrudes beyond its rear outer side, which is not visible. The shift bolt 60 protrudes beyond the outer side of the second carriage 14 visible in FIG. 4. Both shift cam surfaces consist of a straight section, which extends in parallel to the shift direction of the catches in the guide rail, as well as of an end section at the left end of the shift cam surface. This end section is bent away from the cover pieces in downward direction. Each shift cam surface is configured in the nature of a slot-like guide rail.

Movement of the sliding roof module, described so far from the closed position, shown in FIGS. 6a and 6b, into the open position, shown in FIGS. 10a and 10b will now be explained.

In FIGS. 6a and 6b, there is shown the sliding-roof module in its closed position in which the two cover pieces 7, 9 close the roof opening in the vehicle roof 6. In this state, the cable 32 together with the catches 34, 36, 38 are located in the position far most pushed to the left (with respect to the Figures), i.e. pushed towards the front as seen in the travel direction. The first cover piece 7 is locked in this position, because the coupling bolt 20 of the first bar 16 engages into the recess 28 associated with it. As can be seen from a comparison of bars 16 and 18, the bar 16 is in a position swiveled downwards; it extends in horizontal direction. The coupling bolt 20 cannot leave the locking position, because it is prevented from moving upwards by the slot 40 in the first catch 34.

Since the first carriage 12 is arrested relative to the rail, the mounting part 46 is also fixed at place in the position shown. The shift bolt 58 is held stationary, in fact, on the point of intersection between the shift slot 62 in the first carriage 12 and the shift cam surface 66 in the guide rail. Since the shift slot 62 in the first carriage is held stationary relative to the guide rail by means of the first bar 16, the point of intersection between the shift cam surface in the guide rail and the shift slot 62 is also stationary, so that the shift bolt 58 is fixed in place. Since the mounting part 46 is additionally fixed in place on the first carriage 12 by the guide pin 54, the mounting part 46 is held stationary and, hence, so is the first cover piece 7.

The second carriage 14 is held stationary in a similar way. The shift bolt 60 is located at the left end of the shift cam surface 68, so that the second carriage 14 cannot be shifted to the left. A shifting of the second carriage 14 to the right is not possible either, because the coupling bolt 22 of the second bar 18 rests at the right end of the slot 44 in the third catch 38. Since the second carriage 14 is arrested relative to the rail 10, the second mounting part 48 and the second cover piece 9 are also arrested.

In FIGS. 7a and 7b, show the sliding roof module in a state in which the second cover piece 9 is in a ventilation position. This position has been accomplished by the cable 32 having been moved to the right in relation to the position shown in FIGS. 6a and 6b, in fact by the length of the straight section of the slot 40 in the first catch 34.

The position and the state of the first carriage 12 are unchanged. The coupling bolt 20 continues to be located in the recess 28 of the guide rail, because the straight section of the slot 40 of the first catch 34 prevents the coupling bolt 20 from leaving the recess in upward direction. Thus, the first cover piece 7 continues to be in its closed position.

The second carriage 14 is shifted to the right in relation to the state shown in FIGS. 6a and 6b, because it has been entrained to the right by the third catch 38. This has been a forced entraining motion, because the coupling bolt 22 is located in the curved section of the slot 44 in the third catch 38. When the third catch 38 moves to the right, the coupling bolt 22 is in fact biased in a downward direction by the slot 44. Since the coupling bolt 22, however, rests on the locking cam surface 26, it can not be shifted in relation to the position shown in FIGS. 6a and 6b until it has entered the recess 30 in the guide rail. Thus, it is ensued that the third catch 38 entrains the coupling bolt 22 in a forced manner until the recess 30 is reached. This state is shown in FIGS. 7a and 7b. As can be seen by comparing with FIGS. 6a and 6b, the second bar 18 is not in the lifted position any longer, but in the lowered position in which it extends horizontally.

The moving of the second carriage 14 relative to the guide rail forces the shift bolt 60, which engages into the shift slot 64 in the second carriage, to move from the position at the left, bottom end of the shift cam surface 68 shown in FIG. 6a into the position shown in FIG. 7a. The shift bolt 60 is located at the transition between the curved end section of the shift cam surface 68 and the straight section. The moving of the second carriage together with the guide pin 56 in the guide slot 52 results in that the right side of the mounting part 48 also being lifted. Since the lifting amount at the right side of the mounting part is larger than at the left side, there results in all both a translatory motion in upward direction and a rotational, counterclockwise motion. The result of these two motions is that the second cover piece 9 is now located in the ventilation position shown in FIGS. 7a and 7b. This position is stable, because the second carriage 14 is held stationary relative to the guide rail by means of the second bar 18 and the coupling bolt 22. The third catch 38 prevents, to be precise, the coupling bolt 22 from leaving the recess 30.

In FIGS. 8a and 8b, there is shown the sliding roof module in a state in which in addition to the second cover piece 9, the first cover piece 7 is in the ventilation position, too. This state has been accomplished by the cable 32 together with the catches 34, 36, 38 having been shifted further to the right.

When shifting of the first catch 34 to the right starts, at first, the coupling bolt 20 of the first catch 16 will be lifted by the curved left end of the slot 40 in the first catch 34, so that it will leave the recess 28. Next, the first carriage 12 is moved to the right by means of the first bar 16 and the coupling bolt 20 which rests at the left end of the slot 40 in the first catch 34. Upon such moving, the first mounting part 46 is both lifted and swiveled in counterclockwise direction, similar to the manner known from the second mounting part 48. The movement is caused by combined action of the shift bolt 58 both with the shift slot 62 in the first carriage 12 and with the shift cam surface 66 in the guide rail, on the one hand, and by combined action of the guide pin 54 with the guide slot 50 in the mounting part 46, on the other. As can be seen in FIGS. 8a and 8b, the third catch 38 is now decoupled from the second carriage 14.

In FIGS. 9a, 9b there is shown the sliding roof module in a partially open position in which the first cover piece 7 is pushed so as to overlie the second cover piece 9 which continues to be in the ventilation position. In this position, the front section of the roof opening in the vehicle roof 6 is exposed.

The state shown in FIGS. 9a and 9b is accomplished by the cable 32 being pulled further to the right. In so doing, the first catch 34 entrains the first carriage by means of the first bar 16 and the coupling bolt 20, the latter resting at the left end of the slot 40. During the shifting motion of the first carriage, the position of the first mounting part 46 does not change, because the shift bolt 58 slides in the straight section of the shift cam surface 66 in parallel to the shifting direction of the first carriage 12. The first cover piece 7 is pulled towards the second cover piece 9, until the second catch 36 is coupled to the second carriage 14. During such coupling action, the slot 42 is pushed onto the coupling bolt 22 of the second bar 18. Here, the distance between the first catch 34 and the second catch 36 is chosen such that the coupling bolt 22 is located at the transition from the straight section of the slot 42 to the upwardly curved section whenever the first cover piece 7 is located shortly before the second cover piece 9. This state is shown in FIGS. 9a and 9b.

If the cable 32 is pulled to the right beyond this state, the curved end section of the slot 42 in the second catch 36 moves the coupling bolt 32 in an upward direction, so that the coupling bolt 32 will leave the recess 30. Upon a further shifting of the cable 32 to the right, the first catch and the second catch 36 will entrain the first and second carriages 12, 14 to the right, because the coupling bolts 20, 22 each rest at the left end of the slot 40, 42. It is in this way that the two cover pieces can be shifted to the right without resting at each other, until they have reached the completely open position. This state is shown in FIGS. 10a and 10b.

For closing the two cover pieces 7, 9, the cable 32 is pushed to the left (with regard to the Figures) into the guide rail. In so doing, at first the two catches 34, 36 will entrain the two carriages 12, 14 to the left, because the coupling bolts 20, 22 are prevented—due to their resting at the corresponding locking cam surfaces 24 and 26, respectively—to swerve in a downward direction in the slots 40 and 42, respectively. This will be possible only if the second cover piece 9 has reached the position shown in FIGS. 9a and 9b and if the first cover piece 7 has reached the position shown in FIGS. 7a and 7b. In the position shown in FIGS. 9a and 9b, the second catch 36 will be decoupled from the second carriage 14, and in the position shown in FIGS. 7a and 7b the third catch 38 will be coupled to the second carriage 14. Around the end of the shifting of the cable, there will again be reached the closed condition shown in FIGS. 6a and 6b.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and contact of this invention.

What is claimed is:

1. A sliding roof module for a motor vehicle, comprising:
   at least one guide;
   at least two carriages adapted to move on said guide; and
   at least a first catch fixedly attached to a drive device moveable in said guide, wherein said at least first catch is coupled to move one of said carriages, and after a predetermined amount of movement of said carriage, decouples from said carriage, said at least first catch moveable within said at least one guide.

2. The module according to claim 1, wherein said first catch has a coupling cam surface which cooperates with a coupling element, said coupling element being connected with said one carriage.

3. A sliding roof module for a motor vehicle, comprising:
   at least one guide;
   at least two carriages which are adapted to be moved in said guide; and
   at least a first catch fixedly attached to a drive device moveable in said guide, wherein said at least first catch is coupled to move one of said carriages, and after a predetermined amount of movement of said carriage, decouples from said carriage, said first catch has a coupling cam surface which cooperates with a coupling element, said coupling element being connected with said one carriage, wherein said coupling cam surface is formed by a curved slot in said catch.

4. The module according to claim 2, wherein a bar is provided that has two ends and wherein said coupling element is a coupling bolt which is attached to one end of said bar, said other end of said bar being attached to said carriage so as to be moveable.

5. The module according to claim 4, wherein said coupling bolt is adapted to cooperate with a locking cam surface which is attached to said guide.

6. The module according to claim 4, wherein said guide is provided with a recess for arresting said bar.

7. The module according to claim 4, wherein said coupling bolt engages into a recess to arrest said bar and to arrest said carriage relative to said guide.

8. The module according to claim 1, wherein a mounting part is provided on said carriage, said mounting part cooperating with at least one shift cam surface in said guide.

9. A sliding roof module for a motor vehicle, comprising:
   at least one guide;
   at least two carriages which are adapted to be moved in said guide;
   at least a first catch connected with a drive device moveable in said guide, wherein said at least first catch is coupled to move one of said carriages, and after a predetermined amount of movement of said carriage, decouples from said carriage;
   wherein a mounting part is provided on said carriage, said mounting part cooperating with at least one shift cam surface in said guide; and
   wherein said mounting part has a guide slot into which a guide pin engages, said guide pin being fixed to said carriage, and having a shift bolt which is adapted to cooperate with said shift cam surface.

10. The module according to claim 9, wherein said shift bolt cooperates with a carriage cam surface which is formed in said carriage.

11. The module according to claim 1, wherein said drive device is a nonbuckling cable.

12. The module according to claim 11, wherein said catch is fixedly attached to said cable.

13. A sliding roof module for a motor vehicle, comprising:
    at least one guide;
    at least two carriages which are adapted to be moved in said guide;
    at least a first catch connected with a drive device moveable in said guide, wherein said at least first catch is coupled to move one of said carriages, and after a predetermined amount of movement of said carriage, decouples from said carriage;
    wherein a mounting part is provided on said carriage, said mounting part cooperating with at least one shift cam surface in said guide; and
    wherein said at least a first catch comprises a plurality of catches fixedly attached to said drive device at predetermined distances, at least two cover pieces of a two-piece sliding roof cover being attached to said two carriages, each of said cover pieces being adapted to be brought from a closed position via a ventilation position into an open position.

* * * * *